Oct. 28, 1924.
H. W. HACKER
PLANER
Filed Nov. 5, 1921
1,513,390
5 Sheets-Sheet 5
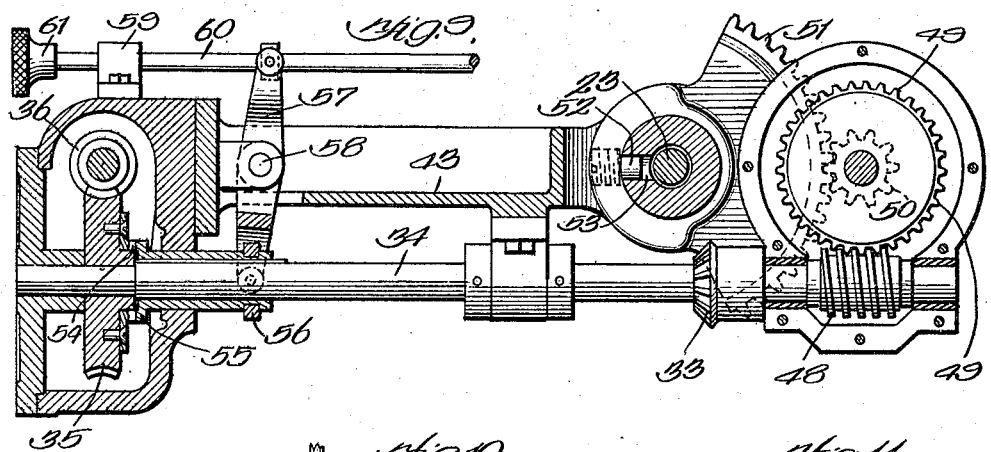
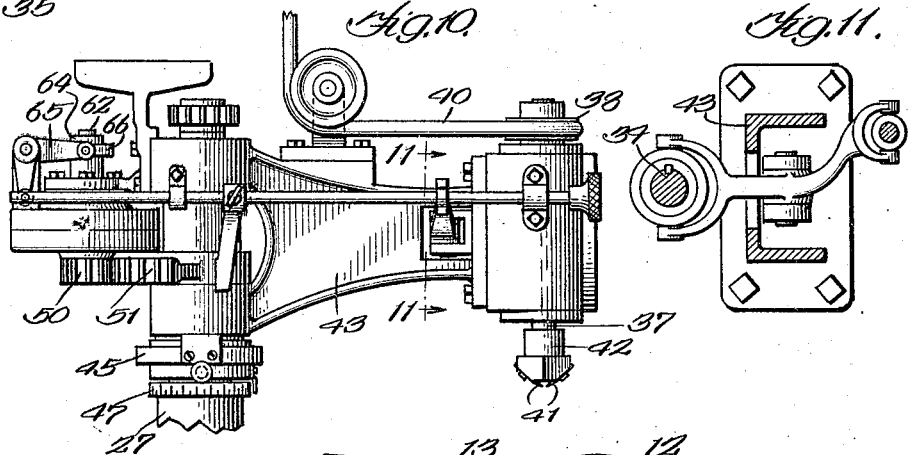
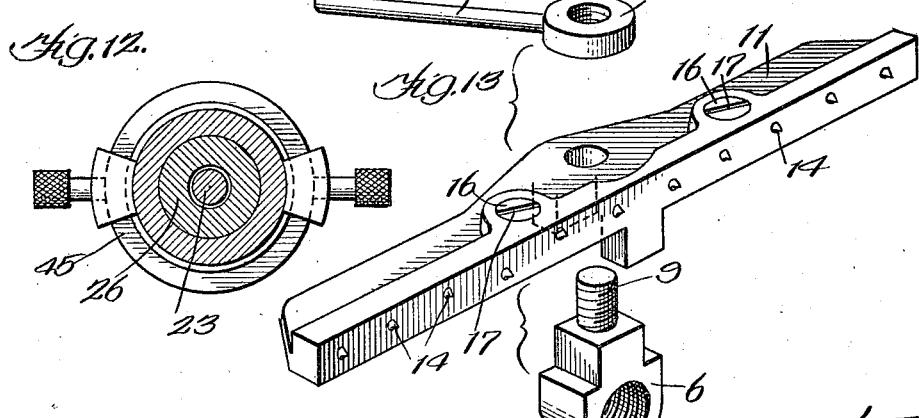
Inventor:
Horace W. Hacker Patented Oct. 28, 1924.

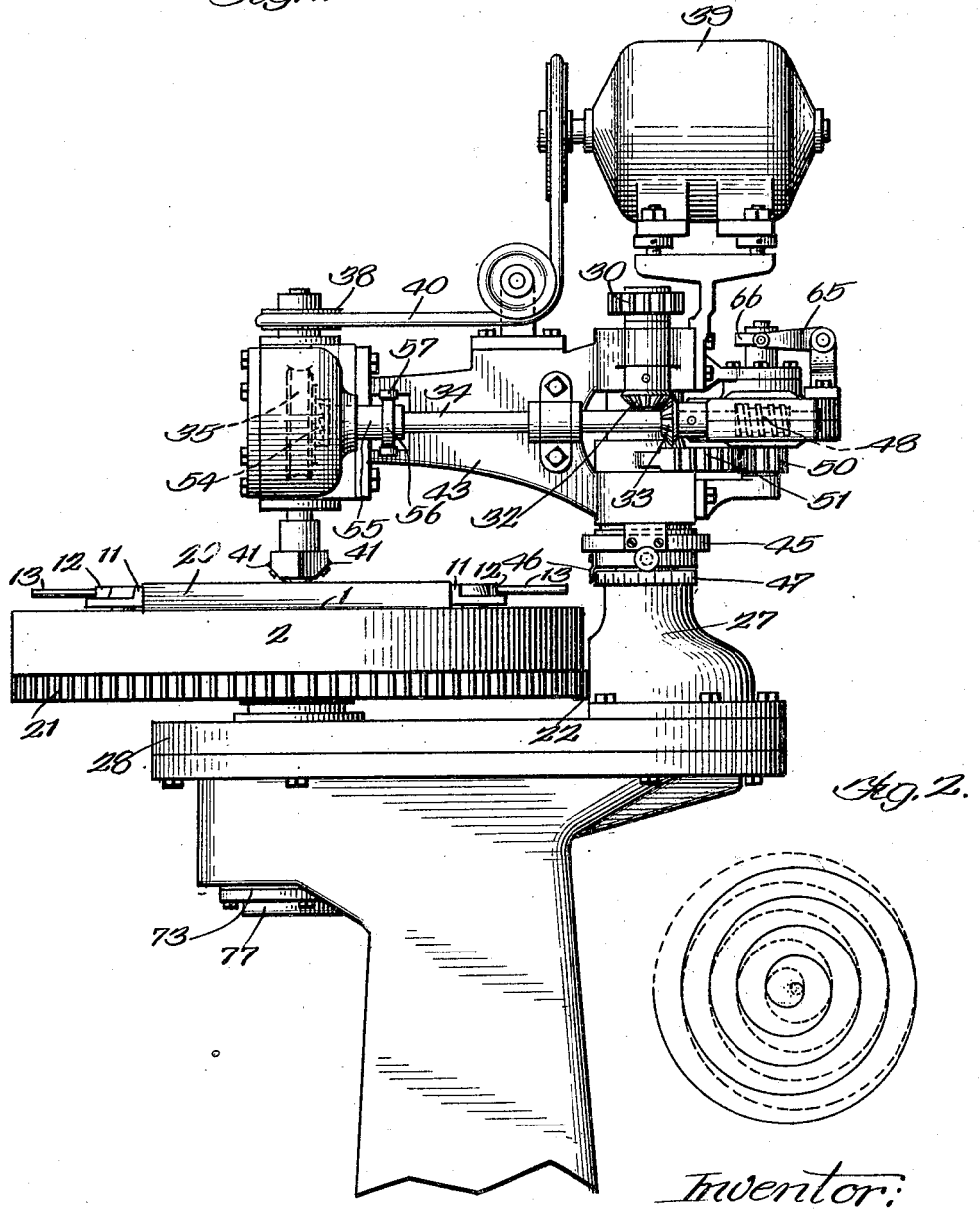

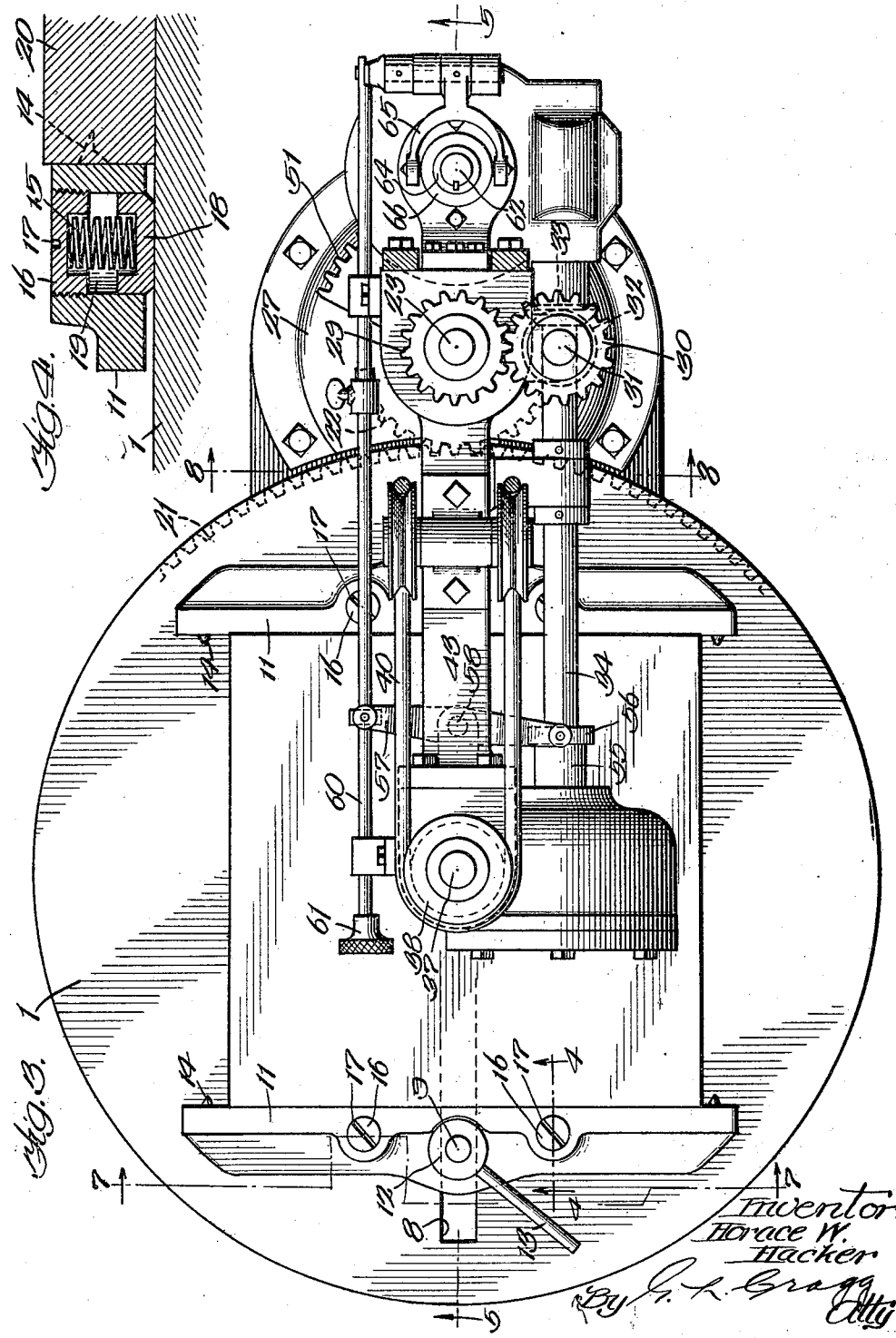

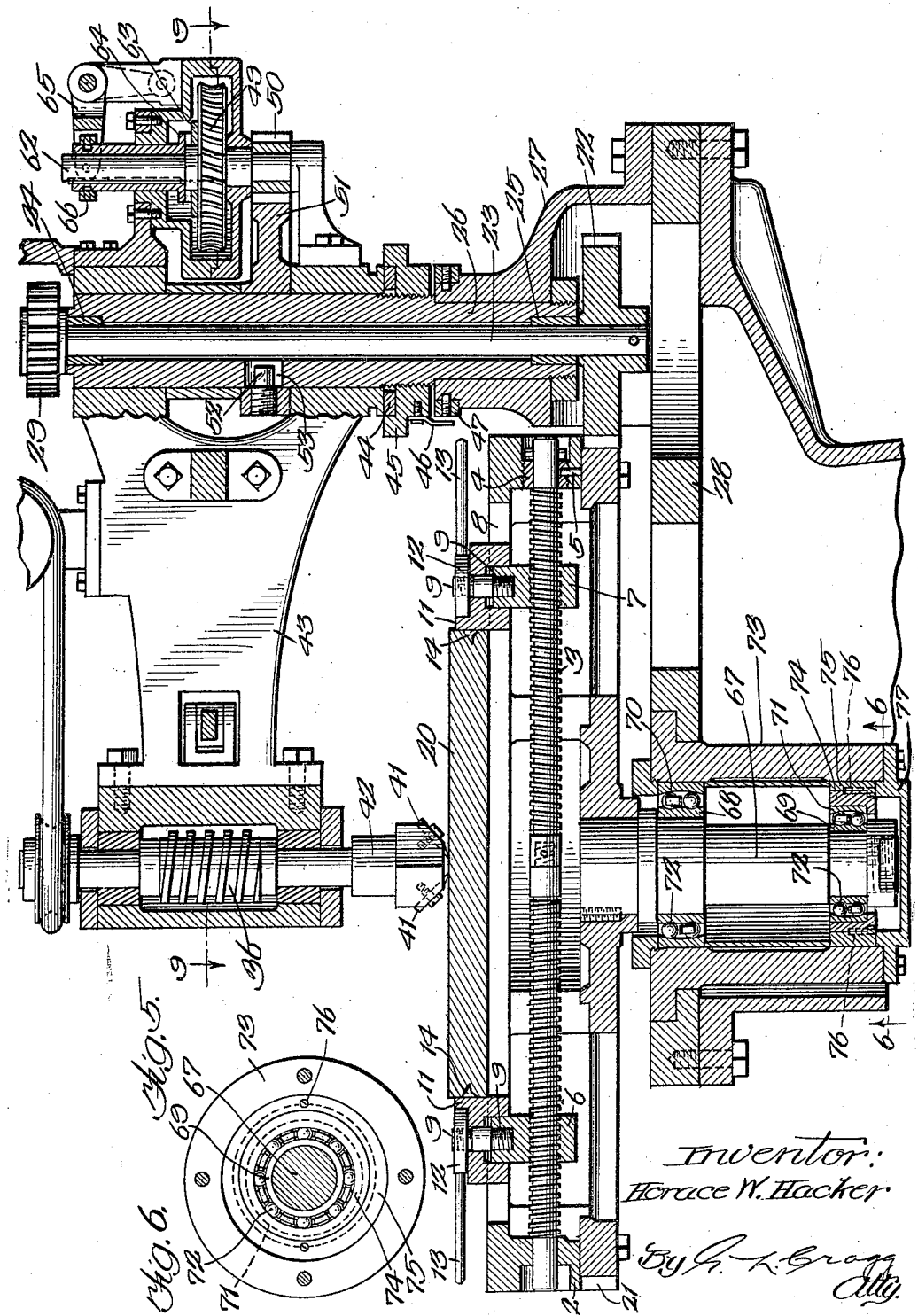

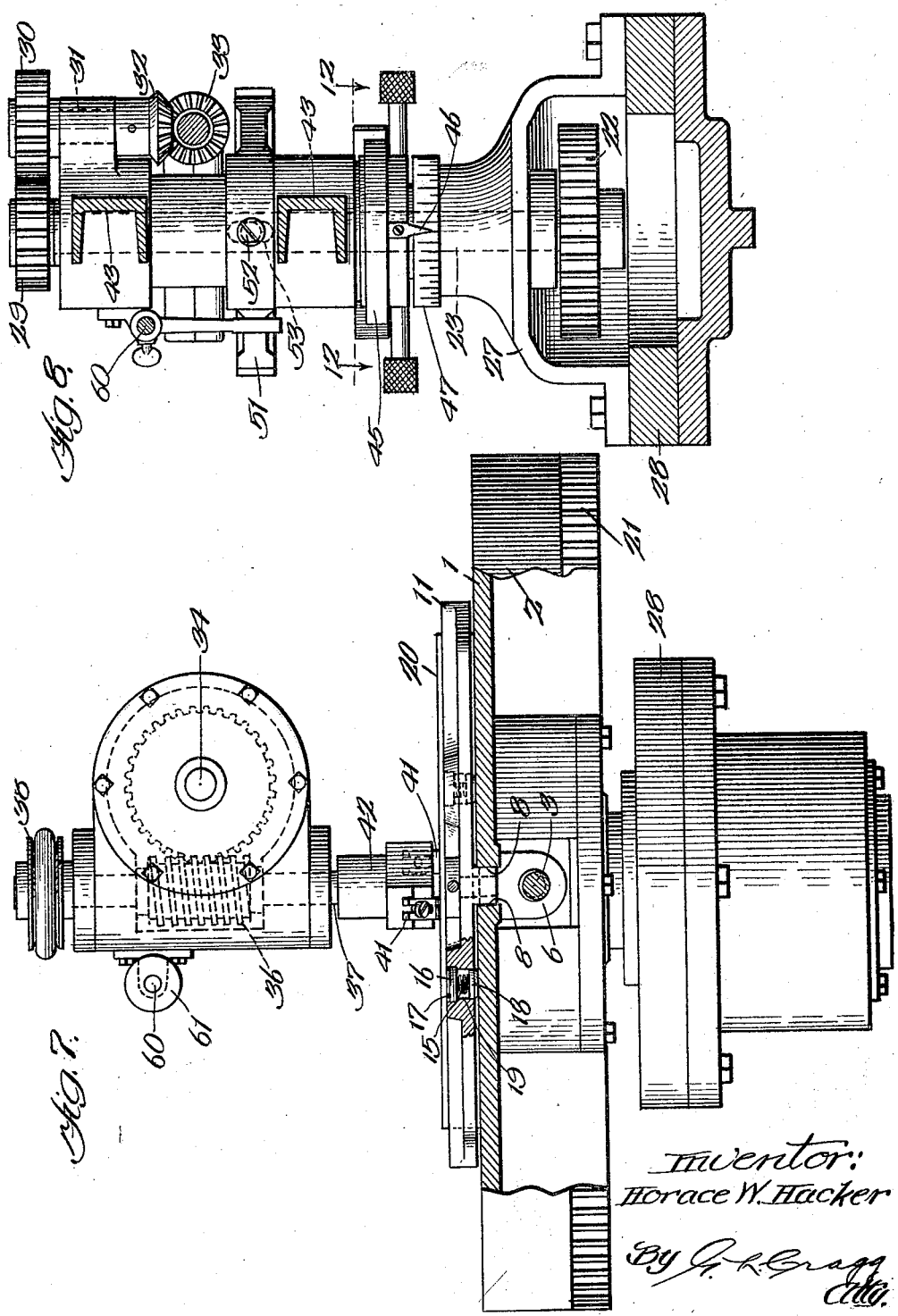

1,513,390

UNITED STATES PATENT OFFICE.

HORACE W. HACKER, OF CHICAGO, ILLINOIS.

PLANER.

Application filed November 5, 1921. Serial No. 512,973.

*To all whom it may concern:*

Be it known that I, HORACE W. HACKER, citizen of the United States, residing at Chicago, in the county of Cook and State of Illinois, have invented a certain new and useful Improvement in Planers, of which the following is a full, clear, concise, and exact description.

My invention relates to planers and has several objects and advantages in view.

The planer of my invention includes a rotating planer blade supporting head and a rotating work supporting bed. Means are provided whereby the axis of the bed may be maintained in parallelism with the axis of rotation of the planer head or may be slightly inclined with respect thereto. When the two axes are parallel, means are provided whereby the blade head may be swung to bring its axis on both sides of the axis of the bed, these movements causing the axis of the planer head to follow one spiral path terminating at the axis of the bed and another spiral path commencing at the bed axis and having its convolutions intervening between the convolutions of the first spiral path and crossing the same. The planer blades, when the planer head follows the second spiral path, serve to dress or finish the cutting effected by the planer blades when the planer head is being swung to its first spiral path.

I also provide means whereby the axes of the planer bed and the axis of swinging movement of the planer head may be placed slightly out of parallelism, a result which is preferably accomplished by slightly inclining the axis of the planer bed. By this adjustment the planer blades may either plane the block upon the bed perfectly flat or with a slight crown, as desired. When the adjustment is such that the latter result is effected the planer head is not swung beyond the axis of the bed.

I will explain my invention more fully by reference to the accompanying drawing in which Fig. 1 is a side view illustrating the preferred embodiment thereof; Fig. 2 is a diagram illustrating a path that may be followed by the planing head; Fig. 3 is a plan view; Fig. 4 is a sectional view of a part of the structure on line 4—4 of Fig. 3; Fig. 5 is a sectional view on line 5—5 of Fig. 3; Fig. 6 is a sectional view on line 6—6 of Fig. 5; Fig. 7 is a sectional view on line 7—7 of Fig. 3; Fig. 8 is a sectional view on line 8—8 of Fig. 3; Fig. 9 is a sectional view on line 9—9 of Fig. 5; Fig. 10 is another side view of the machine looking from a different direction from which Fig. 1 is taken, some parts being omitted; Fig. 11 is a sectional view on line 11—11 of Fig. 10; Fig. 12 is a sectional view on line 12—12 of Fig. 8; and Fig. 13 is a perspective view illustrating portions of the clamping members in separated relation.

Like parts are indicated by similar characters of reference throughout the different figures.

The clamping device illustrated includes a bed 1 of any suitable contour, the bed illustrated being circular in contour and having a depending rim 2 to afford a space beneath the bed proper within which a shaft 3 may be disposed. This shaft is journaled at its left hand end directly in the rim 2 of the bed and at its right hand end it is journaled in a bearing 4 that is threaded into the rim of the bed, there being a pin 5 in the rim of the bed that engages the bearing 4 to hold it in place and which pin, when loosened, will permit the withdrawal of the said bearing. Except for small zones at the mid and end portions of the shaft the shaft is threaded in one direction upon one side and in an opposite direction upon the other side. Two blocks 6 and 7 are in threaded connection with the shaft, the threads therein corresponding in direction to the threads upon the parts of the shaft respectively passing therethrough. These blocks 6 and 7 extend upwardly into a slot 8 formed diametrically across the bed 1, the shaft 3 extending along and being disposed beneath said slot. The blocks cross and extend beyond the slot and underlie the bed preferably on both sides of the slot. These blocks are desirably in constant sliding engagement with the portions of the bed that margin the slot 8 lengthwise so that there is no appreciable upright movement of the blocks with respect to the bed. These blocks are desirably formed of bronze and carry screws 9 that are made of steel and are therefore made separately from the blocks if the latter are of bronze or other material than steel. Clamping jaws 11 are assembled with the blocks, these jaws being movable up and down with respect to the blocks. The screws 9 pass through these jaws and are provided with nuts 12 upon their top ends. These nuts are provided with handles 13 by which they may be turned to force the jaws downwardly toward or upon the bed. The jaws are provided with prongs 14 upon their inner faces. The jaws are preferably normally spaced apart from the bed by means of the upright coiled springs 15, there being two such coiled springs for each jaw and upon opposite sides of the slot. The upper abutment of each spring is desirably in the form of a threaded plug 16 having a screw driver slot 17. By turning this plug the compression of the corresponding spring may be adjusted to regulate its jaw lifting effect. The lower abutment of each spring is in the form of another plug 18 which, however, slides within the corresponding space 19 that contains the associated spring 15. When the device is idle the springs 15 support the jaws a slight distance above the bed 1 and afford clearance between the jaws and the upper ends of the blocks 6 and 7 to permit the jaws to be depressed against the force of the springs when an object, such as a printing block 20, is clamped between the jaws. When the object is to be thus clamped the shaft 3 is turned as by means of a detachable crank. The prongs 14 slope downwardly upon their top sides and their under faces are sloped upwardly so that as the clamps are moved toward each other as a consequence of the clockwise rotation of the shaft 3, the object 20, while being clamped between the jaws, may also be moved downwardly slightly by said prongs rather than upwardly. When this much of the clamping adjustment has been effected the handles 13 are turned clockwise to screw the ends 12 vertically and downwardly upon the top sides of the jaws and against the face of the springs 15 whereby the object 20 is also depressed and brought into firm engagement with the top face of the bed. The working height to which the object 20 is brought by the planing tool corresponds exactly to the distance between the top face of the bed and the cutting edge of the planing tool. In assembling the parts of the clamp portion of the planer, the elements 3, 4 and 5 are out of place, permitting the blocks 6 and 7 to be assembled with the threaded bores that are in alignment with the openings in the rim 2 of the bed that contain the ends of the shaft 3. The screw is passed through the right hand opening (Fig. 5) in the rim of the bed and by suitable manipulation of the screw and the blocks the desired assembly of the screw and blocks is effected. At a suitable stage in the assembly of the parts the bearing sleeve 4 is screwed into place and is held there by means of the pin 5.

The bed 1 is formed with a spur gear 21 upon the base portion of its rim for the purpose of enabling the bed to be rotated upon an axis that is substantially fixed. This gear 21 is in mesh with a pinion 22 that is fixed upon the lower end of a shaft 23 mounted to turn in aligned bearings 24 and 25 that are carried at the opposite ends of an upright stationary sleeve 26 carried by a bracket 27 mounted upon the base 28 of the machine. A spur pinion 29 is fixed upon the upper end of the shaft 23 and is in mesh with another spur pinion 30 that is fixed upon an upper end of a shaft 31, upon the lower end of which there is fixed a bevel pinion 32. This pinion is in mesh with another bevel pinion 33 fixed upon the shaft 34 that carries a worm gear 35. This worm gear is in mesh with a worm 36 fixed upon the upright shaft 37 and has a pulley 38 fixed thereon. An electric motor 39 drives the endless belt 40 that surrounds the pulley 38 whereby the bed 1 is turned through the intermediation of the gearing which has been described. The belt, in addition to turning the table, also serves to drive the planing tool comprising two blades 41 carried upon the lower end of the planer head 42 that, in turn, is carried upon the lower end of the shaft 37. When the motor is in operation the bed is turned and the block 20 with this bed, and the blades 41 are bodily revolved about the axis of the shaft 37. The planer blades are mounted so that the head carrying them may be moved across the table. To this end the shaft 37 that carries the planer blade head is journaled to rotate in the upper end of a swinging bracket 43 that is mounted to turn upon a step bearing 44. This bearing is carried upon a sleeve nut 45 that is in threaded connection with the sleeve 26. In turning this nut the head of the bracket 43 may be regulated to regulate the position of the blades 41 with respect to the object 20 to be planed thereby. The nut 45 may carry an index 46 in front of a suitably graduated ring 47 to aid the adjuster to determine the vertical position of the planer blades. The bracket 43 thus mounted upon its step bearing is adapted to be swung through an arc by means of transmission mechanism intervening between it and the motor 39, this transmission mechanism being inclusive of the belt 40, the pulley 38, the shaft 37, the worm 36, the worm gear 35, the shaft 34, the worm 48, the worm gear 49, the pinion 50 co-axial with the work gear 49 and fixed with respect thereto, and the segmental gear 51 held in non-rotating relation with the stationary sleeve 26 by means of the pin 52 entering the opening 53 in said sleeve, this opening being elongated vertically to permit the bracket 43 to be elevated with respect to the stationary sleeve 26 but being sufficiently narrow to prevent any material turning movement of said segmental gear. The worm gear 35 is coupled with the shaft 34 by means of a clutch having one member 54 upon the gear and a complemental member 55 splined upon the shaft so as to move longitudinally thereof while turning therewith. A collar 56 is freely received in an annular groove in the hub of the clutch member 55. This collar is in trunnion connection with a clutch lever 57 pivoted at 58 upon the bracket 43. A guide 59 is also carried by this bracket. A clutch actuating rod 60 slides through the guide 59 and is connected with the outer end of the clutch lever 57. By pushing upon the button 61 that is upon the outer end of the rod 60 the clutch member 55 is thrown into engagement with the clutch member 54. By pulling upon this button the clutch member 55 is separated from the clutch member 54. By means of the clutching mechanism the shaft 34 may be brought into and out of driving connection with the motor, whereby the rotation of the bed 1 and the oscillation of the bracket 43 may be simultaneously effected or discontinued. Whenever the bracket 43 has been swung through its full range of operation or any selected portion thereof, the shaft 34 is uncoupled in the manner described. In order that the planer blades may be restored to initial position the pinion 50 and the worm 49 should be made loose so that the bracket 43 may be swung by hand to its initial position without being obstructed in this return movement by the worm 48. To this end the common shaft 62 of the pinion 50 and the worm gear 49 are brought into fixed relation with these gear elements by means of a clutch having one member 63 upon the gear 49 and another member 64 complemental to the member 63 and movable along the shaft while turning therewith, to which end the hub of the clutch member 64 is preferably splined upon the shaft. The clutch 54—55 and the clutch 63—64 are preferably simultaneously made effective or ineffective. To this end the clutch actuating rod 60 is also in actuating relation to the clutch member 64 preferably through the intermediation of a bell crank arm 65 having its elbow pivoted upon the casing of the gear 49, its lower end in connection with the inner end of the rod 60 and its upper and forward end in trunnion connection with a ring 66 that is engaged within an annular groove in the hub of the clutch member 64. Whenever the rod 60 is pushed or pulled the bell crank 65 is correspondingly swung so that an adjustment of the clutch 63—64 is effected at the same time a similar adjustment is effected of the clutch 54—55.

In one adjustment of the machine the axis of rotation of the planer head will follow one spiral path, during one portion of the swinging movement of the bracket 43, this spiral path terminating at the center of the block and at the axis of rotation of the bed supporting the block and in another spiral path during the balance of the swinging movement of the bracket 43, the convolutions of one spiral path intervening between and crossing the convolutions of the other, as indicated in Fig. 2. In other words, one spiral path is followed while the planer head is being swung toward the axis of rotation of the bed, the spiral path terminating at said axis. The other spiral path commences at this axis and is followed as the planer head is finishing its swinging movement away from the axis. The blades 41, in following the second spiral path, will finish the cutting that they have effected in the first spiral path. When the blades thus follow both spiral paths the axis of rotation of the block supporting bed and the axis of swinging movement of the planer head are maintained in parallelism. The planed surface is slightly concave which may not be objectionable for certain classes of work, but when the block is to be used for supporting electrotypes and the like it is very desirable that the block be at least perfectly flat, a slight crowning or convexity being unobjectionable and frequently desirable. I have discovered that the block may be made perfectly flat or slightly crowned by inclining the axis of the block supporting bed to a small extent with respect to the axis of the bracket and corresponding to the flatness or the degree of crowning which is desired. When the bed is thus adjusted the bracket 43 carrying the rotating planer head is swung only sufficiently to enable the planer head to follow the first spiral path and not the second, the clutching appliances being operated as soon as the planer head has operated to the middle of the block.

In order that the block supporting bed may be adjusted to bring its axis of rotation slightly out of parallelism with the axis of the planer head supporting bracket for the purpose stated, I place the upright shaft 67 (Fig. 5) that is connected with the planer bed in roller bearings having inner raceways 68, 69 and outer raceways 70, 71. The usual rollers or balls 72 are interposed between the inner and outer raceways as illustrated. The outer raceway 70 of the upper ball bearing is housed in a tubular support 73 and directly engages the inner surface thereof, the outer surfaces of the raceways 68 and 70 and the surface of the support 73 engaging the raceway 70 being cylindrical and co-axial with the shaft 67. The outer surfaces of the raceways 69 and 71 of the lower ball bearing are also cylindrical and co-axial with the shaft 67 but the outer raceway 71, instead of directly engaging the support 73, engages the inner surface of a ring 74 whose surface that is engaged by the raceway 71 is co-axial with the shaft 67. The outer surface of this ring 74 is eccentric with respect to the shaft 67 and engages a ring 75 whose inner surface engaged thereby is also eccentric to the shaft 67. The exterior surface of this ring 75 is cylindrical. By turning the ring 74 the bed 2 may be tilted to the angle desired, the screws 76 passing into the rings 74 and 75 and serving as keys to hold these rings in the relative positions to which they have been adjusted. The rings 74 and 75 are supported by the lower cap plate 77 which is fastened upon the bottom of the support 73. When it is desired to swing the shaft 67 to adjust the table 2 to occupy a perfectly level position or to incline it as desired, the cap plate 77 is withdrawn, the ring 74 is adjusted, and the screws 76 are relocated.

While I have illustrated knives or blades upon the planer head I do not wish to be limited to the instrumentality upon the planer head that is employed for removing material from the object being planed.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a planer, the combination with a rotatable planer head; of a rotatable planer bed, one of the aforesaid elements being mounted to bodily swing; and a mounting for one of the aforesaid elements for holding the axis thereof and the axis of swinging movement out of parallelism.

2. In a planer, the combination with a rotatable planer head; of a rotatable planer bed, one of the aforesaid elements being mounted to bodily swing to bring the axis thereof into and out of close approximation with the axis of the other element; and a mounting for one of the aforesaid elements for holding the axis thereof and the axis of swinging movement out of parallelism.

3. In a planer, the combination with a rotatable planer head; of a rotatable planer bed, one of the aforesaid elements being mounted to bodily swing; a mounting for one of the aforesaid elements for holding the axis thereof and the axis of swinging movement out of parallelism; and gearing for turning the planer head and planer bed.

4. In a planer, the combination with a rotatable planer head; of a rotatable planer bed, one of the aforesaid elements being mounted to bodily swing to bring the axis thereof into and out of close approximation with the axis of the other element; a mounting for one of the aforesaid elements for holding the axis thereof and the axis of swinging movement out of parallelism; and gearing for turning the planer head and planer bed.

5. In a planer, the combination with a rotatable planer head; of a swinging bracket upon which the planer head is mounted; a rotatable planer bed whose axis is offset from the axis of the bracket; and driving mechanism for turning the planer head and planer bed and common thereto.

6. In a planer, the combination with a rotatable planer head; of a swinging bracket upon which the planer head is mounted; a rotatable planer bed, the swinging bracket being disposed to bring the axis of the planer head upon either side of the axis of the planer bed and in close proximity thereto in passing from one side to the other thereof; and driving mechanism for turning the planer head and planer bed and common thereto.

7. In a planer, the combination with a rotatable planer head; of a swinging bracket upon which the planer head is mounted; a rotatable planer bed; driving mechanism for turning the planer head and planer bed and common thereto; and a mounting for the planer bed for tilting its axis with respect to the axis of the bracket.

8. In a planer, the combination with a rotatable planer head; of a swinging bracket upon which the planer head is mounted; a rotatable planer bed; driving mechanism for turning the planer head and planer bed and common thereto; and a mounting whereby the axes of the bracket and planer bed are maintained out of parallelism.

9. In a planer, the combination with a rotatable planer head; of a rotatable planer bed, one of the aforesaid elements being mounted to bodily swing; and a mounting for one of the aforesaid elements for holding the axis thereof and the axis of swinging movement out of parallelism, said mounting being adjustable to vary the extent to which said axes are placed out of parallelism.

10. In a planer, the combination with a rotatable planer head; of a rotatable planer bed, one of the aforesaid elements being mounted to bodily swing to bring the axis thereof into and out of close approximation with the axis of the other element; and a mounting for one of the aforesaid elements for holding the axis thereof and the axis of swinging movement out of parallelism, said mounting being adjustable to vary the extent to which said axes are placed out of parallelism.

11. In a planer, the combination with a rotatable planer head; of a rotatable planer bed, one of the aforesaid elements being mounted to bodily swing; a mounting for one of the aforesaid elements for holding the axis thereof and the axis of swinging movement out of parallelism; and gearing for turning the planer head and planer bed, said mounting being adjustable to vary the extent to which said axes are placed out of parallelism.

12. In a planer, the combination with a rotatable planer head; of a rotatable planer bed, one of the aforesaid elements being mounted to bodily swing to bring the axis thereof into and out of close approximation with the axis of the other element; a mounting for one of the aforesaid elements for holding the axis thereof and the axis of swinging movement out of parallelism, said mounting being adjustable to vary the extent to which said axes are placed out of parallelism.

13. In a planer, the combination with a rotatable planer head; of a swinging bracket upon which the planer head is mounted; a rotatable planer bed; driving mechanism for turning the planer head and planer bed and common thereto; and a mounting for the planer bed for tilting its axis with respect to the axis of the bracket, said mounting being adjustable to vary the extent to which said axes are placed out of parallelism.

14. In a planer, the combination with a rotatable planer head; of a swinging bracket upon which the planer head is mounted, a rotatable planer bed; driving mechanism for turning the planer head and planer bed and common thereto; and a mounting whereby the axes of the bracket and planer bed are maintained out of parallelism, said mounting being adjustable to vary the extent to which said axes are placed out of parallelism.

15. In a planer, the combination with a rotatable planer head; of a rotatable planer bed; a swinging bracket upon which one of the aforesaid elements is mounted and whose axis is offset from the axis of the remaining element; and driving mechanism for turning the planer head and planer bed.

16. In a planer, the combination with a rotatable planer head; of a rotatable planer bed; a swinging bracket upon which one of the aforesaid elements is mounted and whose axis is offset from the axis of the remaining element; and driving mechanism for turning the planer head and planer bed and in driving connection with said bracket to swing it.

17. In a planer, the combination with a rotatable planer head; of a swinging bracket upon which the planer head is mounted; a rotatable planer bed whose axis is offset from the axis of the bracket; and driving mechanism for turning the planer head and planer bed.

18. In a planer, the combination with a rotatable planer head; of a swinging bracket upon which the planer head is mounted; a rotatable planer bed, the swinging bracket being disposed to bring the axis of the planer head upon either side of the axis of the planer bed and in close proximity thereto in passing from one side to the other thereof; and driving mechanism for turning the planer head and planer bed.

19. In a planer, the combination with a rotatable planer head; of a swinging bracket upon which the planer head is mounted; a rotatable planer bed; driving mechanism for turning the planer head and planer bed; and a mounting for the planer bed for tilting its axis with respect to the axis of the bracket.

In witness whereof, I hereunto subscribe my name this first day of November A. D., 1921.

HORACE W. HACKER.